Aug. 1, 1950 — L. H. MORIN — 2,517,402
SIDE COUPLING SEPARABLE FASTENER STRINGER
Original Filed Sept. 10, 1943 — 2 Sheets-Sheet 1
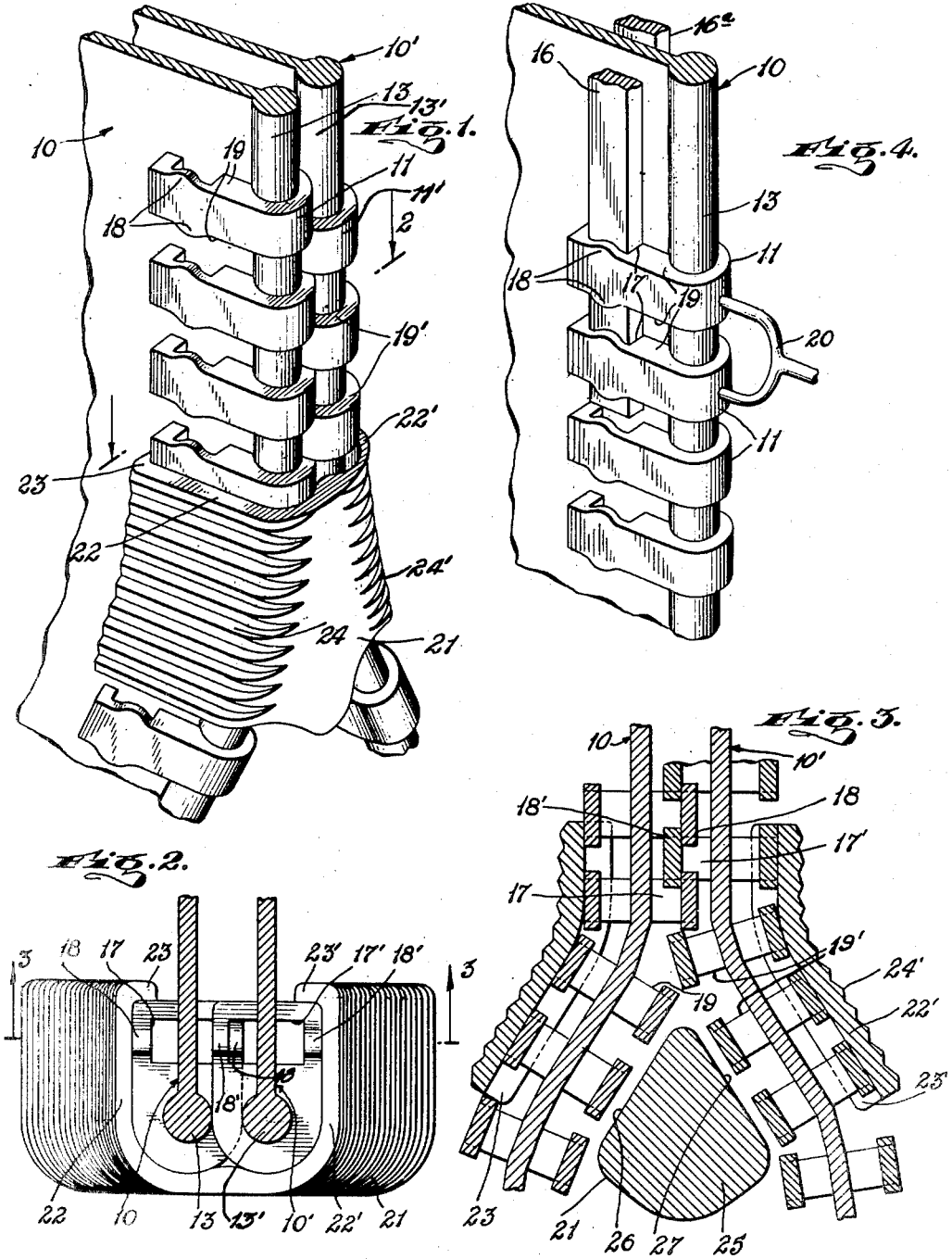
INVENTOR
Louis H. Morin
BY Howard E. Thompson
ATTORNEY Aug. 1, 1950 — L. H. MORIN — 2,517,402
SIDE COUPLING SEPARABLE FASTENER STRINGER
Original Filed Sept. 10, 1943 — 2 Sheets-Sheet 2

INVENTOR
LOUIS H. MORIN
BY
ATTORNEY

Patented Aug. 1, 1950

2,517,402

UNITED STATES PATENT OFFICE 2,517,402

SIDE COUPLING SEPARABLE FASTENER STRINGER

Louis H. Morin, Bronx, N. Y., assignor of one-half to Davis Marinsky, Bronx, N. Y.; Louis H. Morin executor of said Davis Marinsky, deceased Original application September 10, 1943, Serial No. 501,765. Divided and this application January 13, 1945, Serial No. 572,643

15 Claims. (Cl. 24—205.12)

This invention relates to separable fasteners of the type employing stringers with sliders movable along the stringers to couple and uncouple the same. More particularly, the invention relates to the construction of fasteners of the class described wherein the links or scoops are mounted in what may be termed a side by side relationship, rather than the conventional end to end relationship, so that the stringer tapes or other mountings are coupled in overlapped relationship to each other. Still further, the invention relates to devices of the kind described wherein the links on opposed surfaces of the tapes or other mountings have the same form or shape and each link is symmetrical about a median axis, thus adapting the mountings for what might be termed universal attaching. In other words, either side of one mounting may be disposed upon either side of the other mounting.

The novel features of the invention will be best understood from the following descriptions when taken together with the accompanying drawings in which certain embodiments of the invention are disclosed and in which the separate parts are designated by suitable reference characters in each of the views; and in which:

Fig. 1 is a perspective view, showing a pair of mountings with links spaced thereon and coupled and uncoupled by a slider movable along said mountings.

Fig. 2 is a cross-section substantially on the line 2—2 of Fig. 1.

Fig. 3 is a section on the line 3—3 of Fig. 2.

Fig. 4 is a perspective view illustrating the method of forming the links or scoops on the tapes or other mountings.

Figure 5:
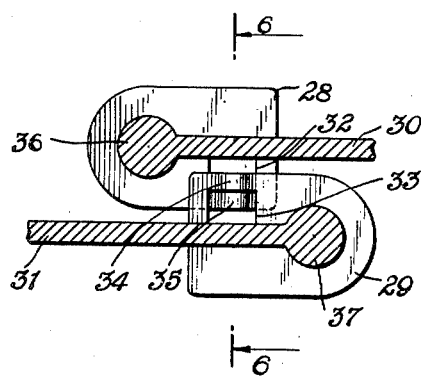
Fig. 5 is a view similar to Fig. 2, showing mountings in a different position, omitting the slider, and showing a modified form of link or scoop construction.

This application constitutes a division of my application Ser. No. 501,765, filed September 10, 1943, now matured into Patent No. 2,401,313, issued June 4, 1946.

In Figs. 1 to 4 inclusive, I have shown two scoop or fastener mounting members 10—10', which may be conventional tapes. These tapes are shown arranged in what is referred to above as side-by-side relationship, that is to say, with their outer edges or beaded portions 13—13' in registration and with their body portions extending in substantially parallel relationship in the same direction from such edges. Sets of appropriately formed scoops 11—11' are secured to the respective mounting members with provisions on the approximate surfaces of the scoops for coupling one set of scoops with the other.

In Figs. 1 to 4 inclusive, all the scoops on each tape are of identical form, each being substantially U-shaped in this instance to embrace both the tape bead and the opposite sides of the tape adjacent and inwardly of the bead. Also, each scoop in this instance is of the same form on the outer as well as on the inner face of each tape, as appears in Figs. 2 and 3.

The upper and lower faces 19—19' of the scoops are flat throughout the length of the scoops except for the upwardly and downwardly projected enlargement 18—18' which constitute male coupling portions; and immediately behind the male coupling portions, i. e. between them and the adjacent face of the tape, is an aperture or female coupling recess 17—17' which extends clear across the scoop (from top to bottom as viewed in Fig. 1). As will be understood, the stringers are securely interlocked against separation in any direction when the male coupling portions 18 of scoops 11 (on the side of tape 10 proximate to tape 10') are entered into the recesses 17' of scoops 11', as shown in Fig. 3. At the same time, of course, and as also shown in Fig. 3, the male coupling portions 18' of the scoops of tape 10' are entered into the recesses 17 of the scoops of tape 10.

In order to couple and uncouple the scoops of mounting members arranged in the manner described, there is provided a slider having what may be termed a generally U-shaped cross-section (Fig. 2) adapting it to embrace both of the tape edges and the scoop members thereon. In longitudinal section in a plane normal to the tapes (Fig. 3) the slider is substantially Y-shaped, incorporating a single channel for the coupled stringers and diverging channels to couple and uncouple the scoops, both the single channel and the diverging channels opening on the same side of the slider body.

Such a slider, generally designated 21, is shown in Figs. 1 to 3 of the drawings. It includes side walls 22, 22', which may be roughened as at 24—24' to provide a good finger grip, and inturned flange portions 23—23' for engagement with the ends of the scoops remote from the tape edges on the outer sides of the tapes. At its wide end the slider has a more or less conventional web portion 25 (Fig. 3) which forms the diverging channels 26—27 through which the scoops pass during coupling and uncoupling.

As above stated, each scoop is of the same form on both sides of its mounting member; and while with the tapes arranged in the described side-by-side relationship this results in the coupling portions on the remote sides of the tapes remaining idle so far as actual interlocking of the tapes is concerned, the scoop portions on the remote faces of the tapes do provide a running support for the slider and, by engagement with its inturned flanges 23—23', secure it against lateral movement or removal. Also it will be recognized, this form of scoop has the advantage of permitting the slider and stringers to be assembled in the described relationship without requiring one particular side of one mounting member to be located facing a particular side of the other mounting member; that is, the stringers are reversible.

As will be understood, scoops appropriate for coupling and uncoupling in the manner and by means of such a slider as that described, can be variously formed but most readily in the present instance by die casting directly on the tapes. As indicated in Fig. 4, the scoops 11 may be cast in pairs, the recesses or apertures 17 being formed by a continuous core member 16 disposed directly upon the surface of tape 10. The corresponding recesses (not shown) on the far side of the tape are likewise formed by a similar core member 16a. The gate 20 resulting from such casting of pairs of scoops is, of course, trimmed off to produce the finished scoops shown in Fig. 1.

In Figs. 5 to 8 inclusive is shown a modification, which, in addition to illustrating the further arrangement of two mountings with respect to each other as previously stated, also shows links or scoops constructed for one surface coupling and uncoupling of two mountings rather than the double surface coupling and uncoupling, as taught in Figs. 1 to 3 inclusive. In other words, in Fig. 5, links or scoops 28 and 29 are arranged upon independent mountings 30, 31 respectively, substantially in the same manner taught in Figs. 1 to 4, excepting that a single core, like either core 16 of Fig. 4, would be employed. This results in the formation of a single aperture 32, 33 on one side surface of each of the scoops 28 and 29, and on said same side surface each scoop will have upwardly and downwardly projecting members 34 and 35 adapted to enter the apertures 33, 32 respectively of scoops arranged on opposed mountings.

With this construction, the mountings 30, 31 have their beaded edge portions 36, 37 in overlapped relationship to each other with the body portion of the mountings extending away from the beads in opposite directions to each other, rather than in the same direction, as taught in Figs. 1 and 2.

The slider 38 employed with the structure shown in Fig. 5 differs from the slider shown in Figs. 1 to 3, primarily in compensating for the offset relationship of the mountings. In other words, the contracted end of the slider, note Fig. 7, will have an opposed arrangement of channel portions 39, 39', opening outwardly at opposite sides, as indicated at 40, 40', for the passage of the mountings 30, 31 therethrough and a corresponding arrangement of flanges 41, 41'.

Figure 8:
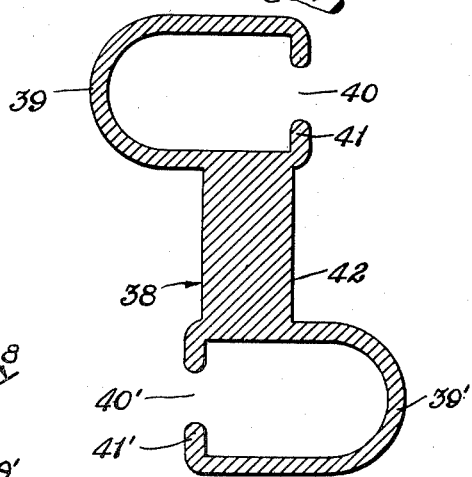
Fig. 8 is a section on the broken line 8—8 of Fig. 6, again showing only the slider.

Considering Fig. 8 of the drawing, this same opposed relationship of the channels 39, 39' is illustrated at the wide end of the slider, where the connecting web 42 is illustrated and the openings 40, 40' are disposed in wider spaced relationship to each other.

In addition to illustrating the opposed directional arrangement of the mountings one with respect to the other, the mountings in Figs. 5 to 8 inclusive further illustrate the arrangement of the coupling portions, namely the apertures or recesses 32, 33 and their projecting members 34, 35 on one side surface only of the links or scoops. While the structure of Fig. 5 will adapt the mountings for two different couplings of the scoops one with the other and, in this sense provide what I term a double action scoop structure with the mountings in Figs. 1 to 3 inclusive, the double action feature is materially amplified to the end that many arrangements of the mountings 10, 10', one with respect to the other, can be provided and, in some of such arrangements, sliders of the type and kind shown in Figs. 6, 7 and 8 would be employed. Whereas sliders of the type shown in Figs. 1 to 3 inclusive, can also be used on scoops of the type shown in Fig. 3 in one of the possible couplings of the mountings 30, 31.

It will be apparent that, while in the present illustration the scoops are shown as formed by die casting processes, these scoops may be formed in any desired manner and attached to the mountings in accordance with conventional practices. Each scoop is substantially U-shaped in cross-sectional form, being modified only in the die casting methods by the material which will extend into the interstices of the braid of a fabric when a braided or woven fabric is used as the mounting.

With scoops of this kind, the legs of the U-shaped body having the male and female couplings arranged thereon are disposed upon the surfaces of the mountings, rather than beyond the edge of the mounting, as in conventional fasteners of the type and kind under consideration.

The slider employed with fasteners of the kind under consideration has a U-shaped or channel cross-sectional form aside from the inturned flanges of the ends of the legs of the channel body, which flanges engage the scoops in retaining the slider against displacement therefrom. Furthermore, it will appear that the web at the wide end of the slider which forms the diverging channels is disposed between the legs of the scoops, which are arranged upon adjacent surfaces of the two mountings to be coupled together.

Figure 7:
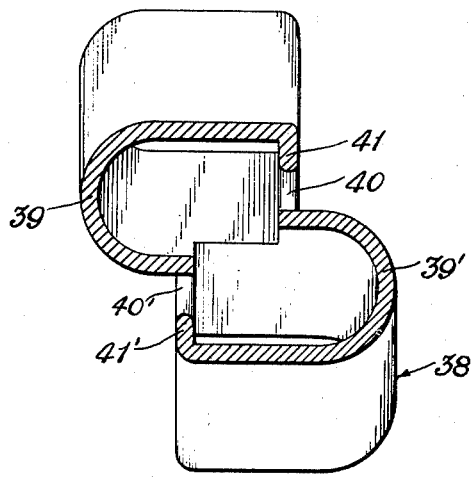
Fig. 7 is a section on the line 7—7 of Fig. 6, showing only the slider.
Figure 6:
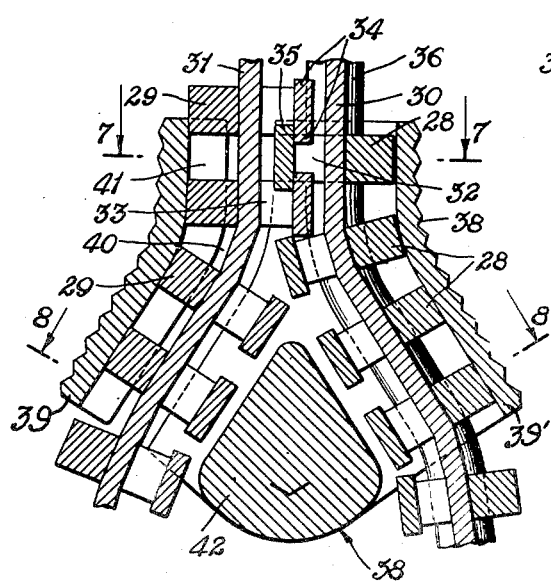
Fig. 6 is a section on the line 6—6 of Fig. 5, taken through the slider employed to couple the stringer chains such as disclosed in Fig. 5.

In Figs. 6 and 7, the channel formation of the slider has the opening of the channels extending to opposite sides of the slider body to care for the coupling arrangement, as illustrated in Fig. 5, in which the edge portions of the two mountings are directed in opposite directions to each other in contrast to the common directional arrangement and alinement of the edges of the mountings, as illustrated in Fig. 1.

Having fully described my invention, what I claim as new and desire to secure by Letters Patent is:

1. In fasteners of the class described, an elongated mounting member having scoops spaced longitudinally of one beaded edge portion thereof, each scoop being substantially U-shaped in cross-sectional form with the beaded edge of the mounting member disposed in the channel formed by said U-shaped contour, the legs of the U-shaped scoop body extending onto opposed surfaces of the mounting member inwardly of the beaded edge thereof, and at least one of said legs of each scoop having a male and female coupling portion on upper and lower sides thereof.

2. The combination with mounting members having overlapped edge portions arranged in parallel relationship to each other, with said edge portions extending in opposite directions to each other, scoops spaced longitudinally of said overlapped edge portions of said members, the scoops of one member interfitting with the scoops of the opposed member on said overlapped and adjacent surfaces of the members, and the interfitting portions of said scoops having male and female couplings on each side of each interfitting portion for retaining the scoops and said members against displacement or separation when coupled together.

3. In combination with a separable fastener mounting member, a series of spaced scoops thereon, each scoop being substantially U-shaped and having its arms extending onto the mounting member on either side thereof, and male and female coupling portions formed on at least one arm of each scoop intermediate the free edge of the mounting member and the inner end of each said arm, said coupling portions being at different distances from the mounting member.

4. In combination with a separable fastener mounting member, a series of spaced scoops thereon, each scoop being substantially U-shaped and having its arms extending onto the mounting member on either side thereof, and male and female coupling portions formed on both the upper and lower sides of at least one arm of each scoop intermediate the free edge of the mounting member and the inner end of said arm.

5. In combination with a separable fastener mounting member, a series of spaced scoops thereon, each scoop being substantially U-shaped and having its arms extending onto the mounting member on either side thereof, and male and female coupling portions formed on both the upper and lower sides of both arms of each scoop intermediate the free edge of the mounting member and the inner end of said arm.

6. In combination with a separable fastener mounting member, a series of spaced scoops thereon, each scoop being substantially U-shaped and having its arms extending onto the mounting member on either side thereof, and at least one arm of each scoop having a recess on the mounting member side of the arm intermediate the free edge of the mounting member and the inner end of each arm.

7. In combination with a separable fastener mounting member, a series of spaced scoops thereon, each scoop being substantially U-shaped and having its arms extending onto the mounting member on either side thereof, and at least one arm of each scoop having upper and lower projecting coupling portions intermediate the free edge of the mounting member and the inner end of each arm.

8. In combination with a separable fastener mounting member, a series of spaced scoops thereon, each scoop being substantially U-shaped and having its arms extending onto the mounting member on either side thereof, and at least one arm of each scoop having a recess on the mounting member side of the arm and upper and lower projecting coupling portions adjacent the recess, said recess and coupling portions being located intermediate the free edge of the mounting member and the inner end of each arm.

9. In combination with a separable fastener mounting member, a series of spaced scoops thereon, each scoop having a pair of arms embracing the mounting member on either side thereof, and coupling portions formed on the same side of at least one arm of each scoop intermediate the free edge of the mounting member and the inner end of each said arm.

10. In combination with a separable fastener mounting member, a series of spaced scoops thereon, each scoop having a pair of arms embracing the mounting member on either side thereof, and coupling portions formed on at least one arm of each scoop intermediate the free edge of the mounting member and the inner end of each said arm, at least one of said coupling portions being contiguous to the mounting member.

11. In combination with separable fastener mounting members, spaced scoops on each member, the scoops of one member being adapted to couple with the scoops of another member, each scoop having a pair of arms embracing the mounting member on either side thereof, and coupling portions formed on at least one arm of each scoop intermediate the free edge of the mounting member and the inner end of each said arm, each scoop having at the other ends of said arms a channel intersecting the longitudinal center line of the scoop for receiving said mounting member, and the major portion of each scoop being offset with respect to an adjacent coupled scoop.

12. In combination with separable fastener mounting members, spaced scoops on each member, the scoops of one member being adapted to couple with the scoops of another member, each scoop having a pair of arms embracing the mounting member on either side thereof, coupling portions formed on at least one arm of each scoop intermediate the free edge of the mounting member and the inner end of each said arm, each scoop having a channel formed in portions of both arms at a point adjacent the other ends thereof for receiving the mounting member, and each scoop overlapping an adjacent coupled scoop at a corner portion only of said coupled scoop.

13. In combination with a separable fastener mounting member, a series of spaced scoops thereon, each scoop having a pair of arms embracing the mounting member on either side thereof, and coupling portions formed on at least one arm of each scoop intermediate the free edge of the mounting member and the inner end of each said arm, said coupling portions being at different distances from the mounting member.

14. In combination with a separable fastener mounting member, a series of spaced scoops thereon, each scoop having arms embracing the mounting member on either side thereof, and a portion of at least one of said arms being spaced from the mounting member intermediate the free edge of said member and the inner end of each said arm.

15. In combination with a separable fastener mounting member, a series of spaced scoops thereon, each scoop having arms embracing the mounting member on either side thereof, and male and female coupling portions formed on the same side of at least one arm of each scoop intermediate the free edge of the mounting member and the inner end of each said arm.

LOUIS H. MORIN.

REFERENCES CITED

The following references are of record in the file of this patent:

UNITED STATES PATENTS

| Number | Name | Date |
|---|---|---|
| 1,817,838 | Poux | Aug. 4, 1931 |
| 2,273,732 | Quisling | Feb. 17, 1942 |

FOREIGN PATENTS

| Number | Country | Date |
|---|---|---|
| 834,398 | France | Aug. 16, 1938 |